(12) United States Patent
Tregub et al.

(10) Patent No.: US 6,224,661 B1
(45) Date of Patent: *May 1, 2001

(54) SEMI-SOLID PIGMENTED INK FOR MARKING POROUS MEDIA

(75) Inventors: Inna Tregub, Oak Park; Augusta Jolly, Canoga Park, both of CA (US)

(73) Assignee: Hitachi Koki Imaging Solutions, Inc., Simi Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,261

(22) Filed: Sep. 30, 1999

(51) Int. Cl.$^7$ .................................................. C09D 11/00
(52) U.S. Cl. ..................... 106/31.61; 106/31.62; 106/31.65; 106/31.67
(58) Field of Search ................... 106/31.61, 31.62, 106/31.65, 31.67, 31.72, 31.88

(56) References Cited

U.S. PATENT DOCUMENTS

| | | | |
|---|---|---|---|
| 4,808,227 | * 2/1989 | Yuasa et al. | 106/31.62 |
| 5,350,446 | * 9/1994 | Lin et al. | 106/31.61 |
| 6,099,631 | * 8/2000 | Tregub et al. | 106/31.85 |

* cited by examiner

Primary Examiner—Helene Klemanski
Assistant Examiner—Veronica F. Faison
(74) Attorney, Agent, or Firm—Pillsbury Winthrop LLP

(57) ABSTRACT

A semi-solid ink composition for marking porous media is described. The ink composition can provide large dot size, low smear, fast drying, and sharp edge definition images when printed on a porous medium, such as a corrugated container. The semi-solid ink composition has the combined properties of both liquid and solid inks.

20 Claims, 2 Drawing Sheets

SEMI-SOLID PIGMENTED INK FOR MARKING POROUS MEDIA

BACKGROUND OF THE INVENTION

The present invention relates to a printing ink, and specifically a pigmented ink for marking porous media.

Ink-jet printing systems have been developed to provide high speed and high quality printing. These printing systems can provide precise printed images quietly, accurately, and at low cost. Drop on-demand systems (or pressure pulse systems) and thermal ink-jet systems are two ink-jet systems that use different methods to eject ink. In these ink-jet printing systems, liquid inks and solid, "hot melt" inks have been developed. "Hot melt" inks are inks which are typically in a solid form at room temperature, but which change to a liquid at an elevated temperature above the room temperature. Hot melt ink technology can be used to print images on many different types of media. The liquid inks are fluid at room temperature. Water-based inks employ water as a primary solvent and oil-based inks employ an organic solvent as a main solvent.

Because the liquid inks are fluid at room temperature, printed images from the inks tend to feather when printed on a porous medium, such as a corrugated container or Kraft paper, limiting the print density and clarity that can be achieved. Hot melt oil-based ink-jet ink compositions, which are solid at room temperature and melt upon heating, can produce smaller dot sizes and reduced smearing because the ink hardens rapidly. If the ink is not hard enough, smear may remain. It is important to maintain both the speed and the quality of printing by adjusting the properties of the printing ink. Dot size and edge definition can be adversely affected when printing on porous media, due in part to bleeding and smearing of the printed image.

SUMMARY OF THE INVENTION

The invention features an ink composition that is semi-solid. The ink composition can provide large dot size, low smear, fast drying, and sharp edge definition images when printed on a porous medium. The semi-solid ink composition has the combined properties of both liquid and solid inks.

In one aspect, the invention features an ink composition including a pigment, a mineral oil, a fatty acid, a low melting point wax, and a resin. The ink composition is semi-solid at room temperature. The semi-solid ink has the consistency of a slurry or paste. The pigment can include carbon black.

In another aspect, the invention features an ink composition, which is semi-solid at room temperature, including less than 10 weight percent of a pigment, at least 10 weight percent of a mineral oil, between about 30 and 70 weight percent of a fatty acid, between about 5 and 30 weight percent of a low melting point wax, less than 10 weight percent of a dispersing agent, and between about 1 and 15 weight percent of a resin.

In yet another aspect, the invention features a method of printing on a porous medium. The method includes delivering an ink composition including a pigment, a mineral oil, a fatty acid, a low melting point wax, and a resin, to a porous medium to form a mark. The mark has a sharp edge and being substantially free of smear.

The ink composition can be used to print a mark on a porous medium, such as a bar code printed on a corrugated container. Errors in reading a bar code can be encountered when the mark lacks density or edge definition. Density and edge definition errors can be encountered when the bar code is printed on a porous medium due to, for example, spreading and wicking of the ink on the substrate. Liquid oil-based inks typically have large dot size due to longer drying time which enables ink to spread on the substrate. In addition, because of spreading, edge definition of such inks is not very clear. The semi-solid ink according to the invention can produce bar codes on porous media with a large dot size that dry quickly and do not smear as readily as liquid inks before they dry. The improved sharpness of the bar code can lead to decreased reading failure errors.

DETAILED DESCRIPTION OF THE INVENTION

Figure 1:
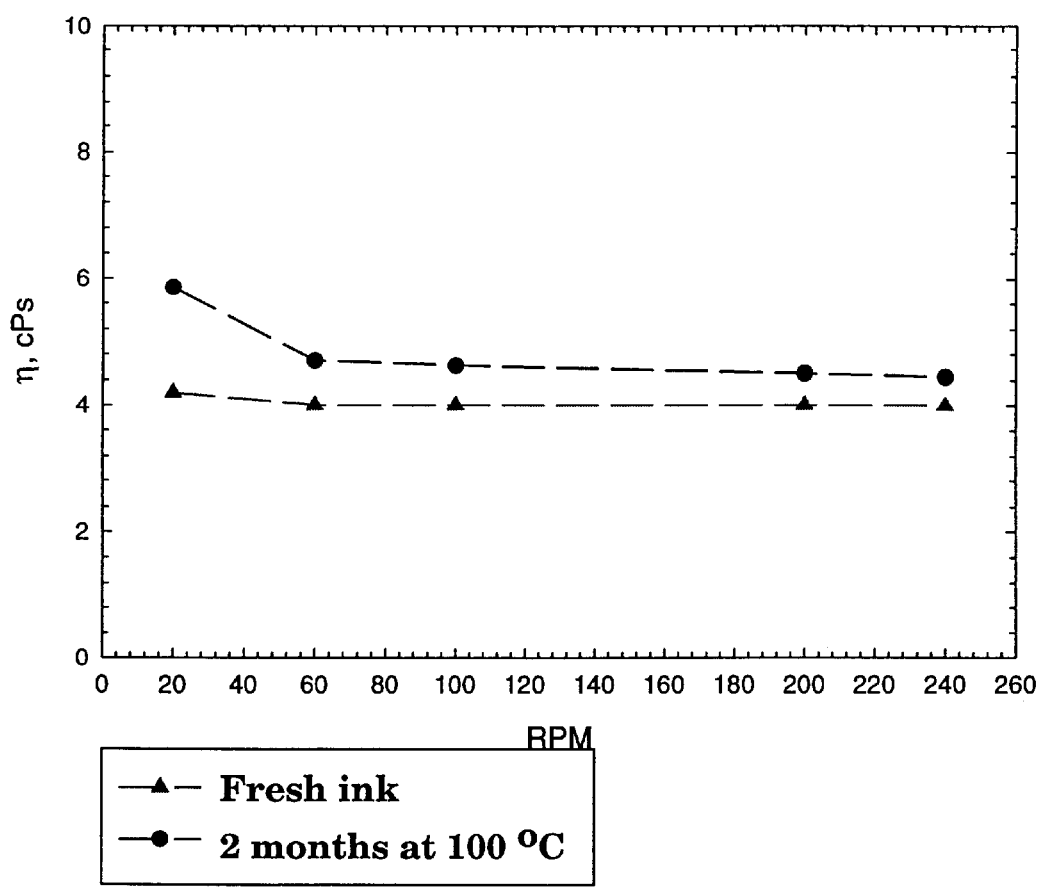
FIG. 1 is a graph depicting the dependence of the viscosity of an ink composition according to the invention.

Ink compositions according to the invention print clear and sharp marks on porous media, such as corrugated containers. The ink prints large dots, which have low smear and exhibit fast drying. The semi-solid nature of the ink composition allows the ink to perform well when printed on a porous medium. The semi-solid ink composition includes a pigment, a mineral oil, a fatty acid, a low melting point wax, and a resin. Optionally, the ink composition includes an antioxidant and dispersing agents.

The pigment imparts color to the ink composition. For printing bar codes on a porous medium, the ink can be black, in which case carbon black can be used as the pigment. When dispersed in the ink composition, the carbon black has a small average particle size with a narrow particle size distribution. The ink composition is a stable dispersion in which the particle size of the pigment changes little over time. For example, the pigment can have an average particle size of between 100 and 170 nanometers and the average particle size can change less than 10% after being heated to 100° C. for one month. In a preferred embodiment, the all of the pigment particles have diameters of 127±18 nm. An example of a suitable pigment carbon black pigment is PRINTEX® 300, PRINTEX® 30 or PRINTEX® 3, in powder or bead form (available from Degussa Inc.). The ink can include less than about 10 weight percent pigment, preferably between about 4 and 10 weight percent pigment, and more preferably between about 4 and 8 weight percent pigment.

The ink composition also contains mineral oil. The ink can include at least 10 weight percent mineral oil, preferably about 10 to 25 weight percent mineral oil.

Mineral oils are components that assist in forming a dispersion of pigment in the ink. Mineral oils include petroleum oils and petroleum waxes. The mineral oil also assists in reducing of ink melting point, and increasing dot size when printed. Examples of suitable mineral oils are MAGIESOL® 40, MAGIESOL® 44; MAGIESOL® 47, and MAGIESOL® 52 (available from Magie Brothers Oil Company).

The ink composition can contain a fatty acid. A fatty acid is a monocarboxylic acid having a carbon chain containing between 12 and 28 carbon atoms, more preferably, between 12 and 24 carbon atoms. The fatty acid chain can include one or more double bonds. Examples of fatty acids include caprylic acid, caproic acid, capric acid, coconut fatty acid, lauric acid, myristic acid, palmitic acid, stearic acid, and the like. The fatty acid preferably has a low melting point. A low melting point fatty acid has a melting point below about 50° C. The ink composition can contain between about 30 and 70 weight percent fatty acid, preferably, between about 40 and 60 weight percent fatty acid. An example of a suitable fatty acid is myristic acid, which provides a good penetration of ink into the substrate and enables a fast drying of the ink.

The ink also contains a low melting point wax. A low melting point wax has a melting point below about 75° C. The ink contains between about 5 and 30 weight percent wax, preferably between about 10 and 20 weight percent wax. An example of a suitable wax is a long chain (e.g., 12 to 28 carbon atoms) amide, such as oleamide, KEMAMIDE® O (available from Witco, Inc.).

The ink can contain between about 1 and 15 weight percent resin, preferably between about 4 and 10 weight percent resin. The resin can be an acrylic resin, a hydrocarbon resin, or a phenolic resin. An example of a suitable resin is an acrylic resin such as to DP-7814-8, DP-7319-85 (available from Westvaco), or DM-55 (available from Rohm and Haas).

In certain embodiments, the ink contains a dispersing agent. The dispersing agent can assist in stabilizing the pigment particles in the ink composition. The dispersing agent can, for example, prevent agglomeration of the pigment particles. The ink can include between about 1 and 5 weight percent, preferably about 2 and 4 weight percent of the dispersing agent. The dispersing agent can be a condensation polymers of polyamines and fatty acids, such as SOLSPERSE® 13,650 (available from Zeneca United Color Technology, Inc.). The range selection of dispersion agent depends on particular formulation. The dispersing agent can include a second dispersant, which can act as a synergist, aiding dispersion. The ratio of synergist to dispersant can be determined experimentally. Preferably, the amount of synergist is between about 0.03 and 1.0 weight percent of the composition. An example of a suitable synergist is a substituted ammonium phthalocyanine such as SOLSPERSE® 5,000 (available from United Color Technology, Inc.).

The ink can also include an antioxidant. The ink can include between about 0.1 to 3 weight percent antioxidant. They can be, but are not limited to, IRGAFOS® 168 and IRGANOX® 565 (available from Ciba, Inc.). The amount of antioxidant can be established experimentally or according to recommendations of the manufacturer.

The ink composition is formed by thoroughly mixing the components. Generally, the resin and mineral oil are stirred with heating until the resin dissolves completely. The mixture can be heated to between about 90° C. and about 140° C. Then the dispersant is added and dissolved. Next, the pigment is added and the mixture is thoroughly mixed. The mixture is then milled at a high rate to fully disperse the pigment and to break up the pigment into particles having a small average size. The fatty acid and wax are then sequentially added to the mill, with milling after each addition. The ink composition is then filtered through a 1 µm filter to remove particulates.

The ink composition can be used for printing with any suitable apparatus, but is preferably used in an ink jet apparatus. When used in an ink jet apparatus, the ink composition has qualities that are generally required for ink jet inks, such as good printing quality, dot size, and good jetability. In order to print well, the viscosity of the ink is controlled by adjusting the composition so that it falls within an acceptable range at the nominal operating temperature of the print head. The ink composition can have a viscosity of below 15 centipoise (cPs) at the jetting temperature (60° C. to 300° C.). Preferably, the viscosity is between about 8 and 12 cPs at 80° C.

The following specific examples are to be construed as merely illustrative, and not limitive, of the remainder of the disclosure.

EXAMPLES

Examples of ink compositions are summarized in Tables 1.1–1.7. The ink compositions were prepared by the following procedure, which details the preparation of the ink composition listed in Table 1.1. The other compositions were prepared by the same general method.

1. Resin DP-7814-8 (15 g) was added to 65.7 of MAGIESOL® 52 mineral oil. The resin dissolved completely while stirring on a hot plate.

2. SOLSPERSE® 13,650 (7.2 g) was added to the mixture. The material dissolved completely while stirring on the hot plate.

3. SOLSPERSE® 5,000 (0.3 g) was added and mixed in.

4. To this mixture was added to 12 g of Carbon Black PRINTEX® 300, which was then mixed thoroughly.

5. The mixture was milled at 2380 rpm with small (1 mm) stainless media for 45 minutes.

6. Myristic acid (140 g) was added to the mill base and milled for 15 more minutes.

7. KEMAMIDE® O wax (50 g) was added to the mill base and milled for 15 more minutes.

8. The mixture was removed from the mill, separated from the media and iron residues and filtered through a 1 µm filter.

TABLE 1.1

| INGREDIENTS | % BY WEIGHT |
| --- | --- |
| Carbon Black PRINTEX ® 300 | 4.14 |
| SOLSPERSE ® 13,650 | 2.48 |
| SOLSPERSE ® 5,000 | 0.03 |
| MAGIESOL ® 52 | 22.66 |
| DP-7814-8 | 5.17 |
| Myristic Acid | 48.28 |
| KEMAMIDE ® O | 17.24 |

TABLE 1.2

| INGREDIENTS | % BY WEIGHT |
| --- | --- |
| Carbon Black PRINTEX ® 300 | 4.14 |
| SOLSPERSE ® 13,650 | 2.48 |
| SOLSPERSE ® 5,000 | 0.03 |
| MAGIESOL ® 52 | 22.66 |
| DP-7319-85 | 5.17 |
| Myristic Acid | 48.28 |
| KEMAMIDE ® O | 17.24 |

TABLE 1.3

| INGREDIENTS | % BY WEIGHT |
| --- | --- |
| Carbon Black PRINTEX ® 300 | 5.17 |
| SOLSPERSE ® 13,650 | 3.10 |
| SOLSPERSE ® 5,000 | 0.05 |
| MAGIESOL ® 52 | 21.02 |

TABLE 1.3-continued

| INGREDIENTS | % BY WEIGHT |
| --- | --- |
| DP-7814-8 | 5.17 |
| Myristic Acid | 48.25 |
| KEMAMIDE ® O | 17.23 |

TABLE 1.4

| INGREDIENTS | % BY WEIGHT |
| --- | --- |
| Carbon Black PRINTEX ® 300 (beads) | 6.20 |
| SOLSPERSE ® 13,650 | 3.79 |
| SOLSPERSE ® 5,000 | 0.05 |
| MAGIESOL ® 52 | 19.30 |
| DP-7814-8 | 5.17 |
| Myristic Acid | 48.25 |
| KEMAMIDE ® O | 17.23 |

TABLE 1.5

| INGREDIENTS | % BY WEIGHT |
| --- | --- |
| Carbon Black PRINTEX ® 300 | 6.20 |
| SOLSPERSE ® 13,650 | 3.79 |
| SOLSPERSE ® 5,000 | 0.05 |
| MAGIESOL ® 48 | 14.13 |
| DP-7814-8 | 10.34 |
| Myristic Acid | 48.25 |
| KEMAMIDE ® O | 17.23 |

TABLE 1.6

| INGREDIENTS | % BY WEIGHT |
| --- | --- |
| Carbon Black PRINTEX ® 300 | 5.17 |
| SOLSPERSE ® 13,650 | 3.79 |
| SOLSPERSE ® 5,000 | 0.05 |
| MAGIESOL ® 52 | 20.33 |
| DP-7814-8 | 5.17 |
| Myristic Acid | 48.25 |
| KEMAMIDE ® O | 17.23 |

TABLE 1.7

| INGREDIENTS | % BY WEIGHT |
| --- | --- |
| Carbon Black PRINTEX ® 300, beads | 6.21 |
| SOLSPERSE ® 13,650 | 3.79 |
| SOLSPERSE ® 5,000 | 0.69 |
| MAGIESOL ® 52 | 17.10 |
| DP-7814-8 | 6.21 |
| IRGAFOS ® 168 | 0.34 |
| IRGANOX ® 565 | 0.14 |
| Myristic Acid | 48.28 |
| KEMAMIDE ® O | 17.24 |

The properties of the ink compositions were evaluated. Unless otherwise stated, the properties are for the ink composition described in Table 1.1.

1. Dot Size

The size of the dots of oil containing solid and semisolid inks is usually bigger than for a conventional solid ink (e.g. 8×5×25). For a particular formula, dot size depends on concentration of the pigment. The dot size of three compositions (Table 1.1, 1.3, and 1.4 contain 4, 5, and 6 percent pigment, respectively) are listed in Table 2.1, as formed on ordinary white paper.

TABLE 2.1

Dots size (mil) at different pigment concentrations printed at 100° C.

| Pigment percentage by weight | Length, mil | Width, mil | Area, mil$^2$ |
| --- | --- | --- | --- |
| 4 | 10.0 | 6.9 | 34 |
| 5 | 11.14 | 6.7 | 39 |
| 6 | 11.24 | 7.7 | 42 |

2. Rheology

Viscosity tests of the ink composition of Table 1.1 showed almost Newtonian behavior at a wide range of shear stress and rotation speed, indicating the high quality of the dispersion. Other evidence of good dispersion were the insignificant changes of viscosity after the ink was stored at 100° C. for 2 months. Viscosity of the ink was measured with a BROOKFIELD DV-III digital rheometer. FIG. 1 shows the dependence of the viscosity of the ink (Table 1.1.) which contained 4 wt % of pigment based on a rotation speed at a temperature of 120° C. The fresh ink viscosity is shown with a triangle; the aged ink viscosity is shown with a circle.

3. Particle Size Analysis

Particle size analysis of the ink composition of Table 1.1 was performed with a 4 Plus Coulter particle size analyzer. All measurements were taken in mineral oil, which was a part of the ink vehicle, at 35° C. Particle size analysis was completed for the freshly made ink and for ink which was kept at 100° C. for 1 month. The particle size distribution of the fresh ink was sharp and narrow, with an average particle size of 127±18 nm. The ink which was kept at 100° C. for 1 month had a slightly higher average particle size of 137±24 nm. In each composition, all particles fell within the recited ranges. The small increase of particle size and distribution during aging indicates minor changes of dispersion. However, these changes were not strong enough to cause any visible phase separation.

4. Light Fastness

Figure 2:
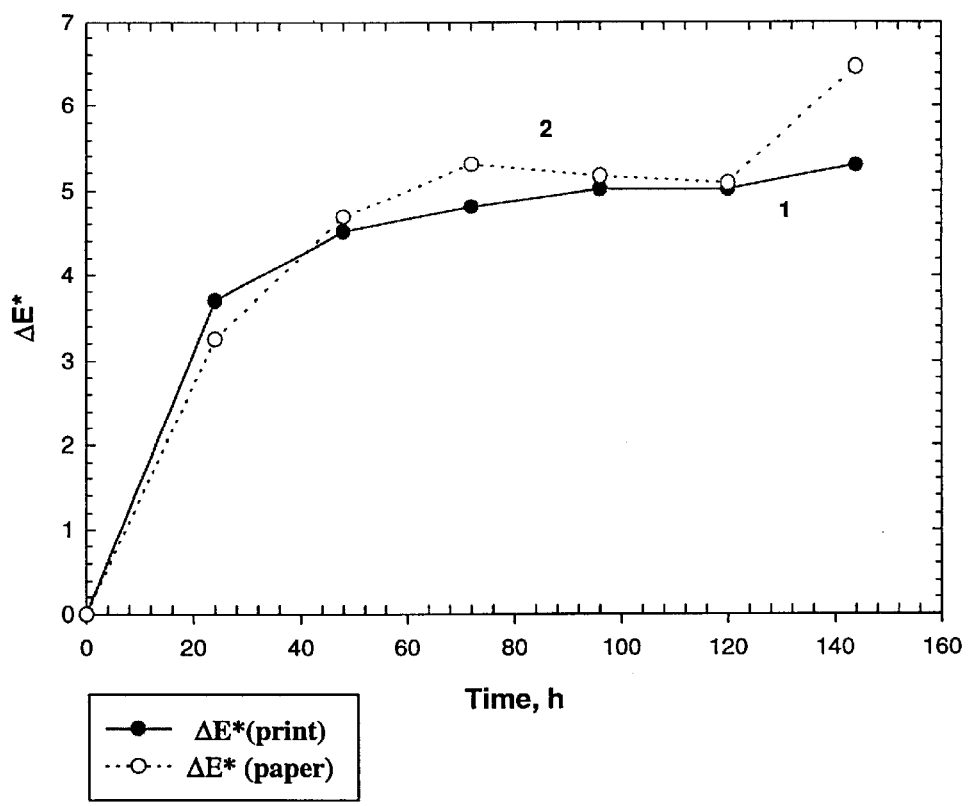
FIG. 2 is a graph depicting the light fastness characteristics of a sample printed with the ink composition according to the invention.

The irradiation characteristics (e.g., light stability) of the ink compositions after exposure to a 750 W/m$^2$ Xenon lamp source are shown in FIG. 2. The symbol ΔE* stands for color difference between the standard and sample. Irradiation was performed using 750 W/m$^2$ lamp from ATLAS ELECTRIC DEVICE COMPANY and the test was carried out at a temperature of 50° C. using the ink composition of Table 1.1. Under these conditions, approximately 4.2 hours of irradiation is comparable to one day exposure to the sun in Arizona. See ATLAS DSET Laboratory data and ATLAS Material Testing Products and Technology News v.26(54), (1996). Color change (ΔE) measurements were measured as changes in reflectance using the Milton Roy Color Graph device with a D65b illuminant and a 2-degree observer.

The carbon black ink print sample on brown porous paper (Kraft paper) was irradiated for 6 days. As depicted in FIG. 2, the color changes of the print sample (1) and of the paper itself (2) are very similar. The observed changes in color are caused primarily by the fading of the substrate color.

Changes in the color density were monitored during the same experiment using a Macbeth RD918 analyzer. It decreased from 1.07 to 1.00.

5. Thermal Analysis

DSC analysis of the ink composition of Table 1.1 was performed using a Perkin Elmer DSC 7 thermal analyzer. The melting process started at about 24° C., and was complete at 50° C. The cooling peak began at about 25° C. and had a maximum at about 19° C. A difference of about 50–55° C. exists between printing and solidifying temperatures for this ink composition, enabling the ink to spread well on the substrate before solidifying, leading to large, sharp dots.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An ink composition comprising a pigment, a mineral oil, a fatty acid, a low melting point wax, and a resin, wherein the ink composition is semi-solid at room temperature.

2. The ink composition of claim 1 wherein the pigment includes carbon black.

3. The ink composition of claim 1 wherein the fatty acid includes myristic acid.

4. The ink composition of claim 1 wherein the low melting point wax includes an amide wax.

5. The ink composition of claim 1 wherein the resin includes an acrylic resin.

6. The ink composition of claim 1 further including a dispersing agent.

7. The ink composition of claim 1 wherein the ink composition has a viscosity of below 15 cPs at 80° C.

8. The ink composition of claim 1 wherein the fatty acid has a melting point of less than about 50° C.

9. The ink composition of claim 1 wherein the pigment has an average particle size of between 100 and 170 nanometers.

10. An ink composition comprising:
    less than 10 weight percent of a pigment;
    at least 10 weight percent of a mineral oil;
    between about 30 and 70 weight percent of a fatty acid;
    between about 5 and 30 weight percent of a low melting point wax;
    less than 10 weight percent of a dispersing agent; and
    between about 1 and 15 weight percent of a resin,
    wherein the ink composition is semi-solid at room temperature.

11. The ink composition of claim 10 wherein the pigment includes carbon black, the fatty acid includes myristic acid, the low melting point wax includes an amide wax, and the resin includes an acrylic resin.

12. The ink composition of claim 10 further including an anti-oxidant.

13. The ink composition of claim 10 comprising:
    between about 4 and 8 weight percent of a pigment;
    between about 10 and 25 weight percent of a mineral oil;
    between about 40 and 60 weight percent of a fatty acid;
    between about 10 and 20 weight percent of a low melting point wax;
    between about 2 and 4 weight percent of a dispersing agent; and
    between about 4 and 10 weight percent of a resin.

14. The ink composition of claim 10 wherein the ink composition has a viscosity of below 15 cPs at 80° C.

15. The ink composition of claim 10 wherein the fatty acid has a melting point of less than about 50° C.

16. The ink composition of claim 10 wherein the pigment has an average particle size of between 100 and 170 nanometers.

17. A method of printing on a porous medium comprising:
    delivering an ink composition including a pigment, a mineral oil, a fatty acid, a low melting point wax, and a resin, to a porous medium to form a mark, the mark having a sharp edge and being substantially free of smear.

18. The method of claim 17 wherein the porous medium is a corrugated container.

19. The method of claim 18 wherein the ink composition includes between about 4 and 8 weight percent of a pigment, between about 10 and 25 weight percent of a mineral oil, between about 40 and 60 weight percent of a fatty acid, between about 10 and 20 weight percent of a low melting point wax, between about 2 and 4 weight percent of a dispersing agent, and between about 4 and 10 weight percent of a resin.

20. The method of claim 17 wherein the mark is a bar code.

* * * * *